United States Patent
Greiner et al.

(10) Patent No.: US 6,809,134 B2
(45) Date of Patent: Oct. 26, 2004

(54) GLASS/PLASTIC COMPOUNDS

(75) Inventors: Robert Greiner, Baiersdorf (DE);
Heinrich Kapitza, Fuerth (DE);
Manfred Ochsenkuehn, Berg (DE)

(73) Assignee: SIEMENS Aktiengesellschaft, Munich (DE)

(*) Notice: Subject to any disclaimer, the term of this patent is extended or adjusted under 35 U.S.C. 154(b) by 0 days.

(21) Appl. No.: 10/257,664

(22) PCT Filed: Apr. 12, 2001

(86) PCT No.: PCT/DE01/01460
§ 371 (c)(1),
(2), (4) Date: Oct. 15, 2002

(87) PCT Pub. No.: WO01/79338
PCT Pub. Date: Oct. 25, 2001

(65) Prior Publication Data
US 2003/0064876 A1 Apr. 3, 2003

(30) Foreign Application Priority Data
Apr. 14, 2000 (DE) .......................... 100 18 705

(51) Int. Cl.[7] .............................................. C08K 13/02
(52) U.S. Cl. ...................... 524/101; 524/103; 524/261; 524/403; 524/405; 524/415; 523/223
(58) Field of Search ................................ 524/101, 103, 524/261, 403, 405, 415; 523/223

(56) References Cited

U.S. PATENT DOCUMENTS

| | | | | | |
|---|---|---|---|---|---|
| 3,732,181 A | * | 5/1973 | Ray et al. | .................... | 523/207 |
| 4,285,730 A | * | 8/1981 | Sanford et al. | ................ | 501/44 |
| 4,360,616 A | * | 11/1982 | Pagilagan | .................... | 524/100 |
| 4,504,611 A | * | 3/1985 | Ilardo et al. | ................. | 524/101 |
| 4,548,972 A | * | 10/1985 | Williams | .................... | 524/100 |
| 4,552,912 A | * | 11/1985 | Williams | .................... | 524/100 |
| 5,043,369 A | * | 8/1991 | Bahn et al. | ................. | 523/466 |
| 5,292,690 A | | 3/1994 | Kawachi et al. | | |
| 5,328,874 A | * | 7/1994 | Beall et al. | .................... | 501/45 |
| 5,507,990 A | * | 4/1996 | Bookbinder et al. | ........ | 264/143 |
| 5,714,550 A | * | 2/1998 | Shaw | ......................... | 525/393 |

FOREIGN PATENT DOCUMENTS

| | | | | |
|---|---|---|---|---|
| DE | 199 60 548 A1 | 6/2001 | | |
| EP | 773196 A1 | * 5/1997 | .......... | C03C/14/00 |

* cited by examiner

Primary Examiner—Matthew A. Thexton
(74) Attorney, Agent, or Firm—Young & Thompson

(57) ABSTRACT

The thermoplast-based glass/plastic compounds according to the invention contain a low melting point sulfophosphate glass having the following composition: 4 to 10% $Li_2O$; 4 to 10% $Na_2O$; 4 to 8% $K_2O$; 1 to 2% CaO; 35 to 37% ZnO; 0 to 3% $La_2O_3$; 19 to 22% $P_2O_5$ and 19 to 22% $SO_3$, a high-performance thermoplast, an organic additive and/or a mineral filling material and optionally also carbon black and/or a sterically hindered phosphite or phenol.

17 Claims, No Drawings

GLASS/PLASTIC COMPOUNDS

CROSS REFERENCE TO RELATED APPLICATIONS

This is the 35 USC 371 national stage of international application PCT/DE01/01460 filed on Apr. 12, 2001, which designated the United States of America.

FIELD OF THE INVENTION

The invention relates to glass/plastic compounds based on thermoplastic, and to a process for producing them.

BACKGROUND OF THE INVENTION

Reinforced plastics materials, mainly based on thermoplastics, are used in electrical engineering and electronics to produce appliances and components. The reinforced thermoplastics used are usually thermoplastic compounds which contain glass fibers.

It is known that, on account of external contamination of the insulation caused by deposits of dust and chemicals or other contamination, a current, known as a tracking current, can flow on insulating-material surfaces when a voltage is applied. In the case of plastic insulating materials, this leads to the formation of a conductive tracking path on the plastic surface, which is attributable to thermal degradation products formed from the polymer matrix. However, the insulating action of the plastic is thus lost. The voltage level at which a conductive tracking path is formed is dependent on the material. This phenomenon, i.e. the occurrence of tracking currents and the formation of tracking paths, limits the possible uses of the various groups of polymer materials as electrical insulants to a certain extent, since in many cases a high tracking resistance is also demanded for use in electrical engineering as well as a high electrical strength.

Particularly in the case of electrical and electronic parts and components, high demands are imposed on the tracking resistance, i.e. the CTI value (CTI=Comparative Tracking Index). For example, in the case of relay components for actuators and caps, CTI values of at least ≧125 V, and generally even ≧175 V, are required. For relay base bodies in what are known as "white goods", this requirement is generally ≧175 V, and for use in the automotive sector this value is at least ≧225 V. For other applications in electrical engineering or electronics, for example in housings, the requirements may even be significantly higher still.

It is known that high-temperature thermoplastics, i.e. high-performance thermoplastics, apart from partially aromatic polyamides, have only a noticeably low tracking resistance of approx. 100 to 175 V. This low tracking resistance may even be reduced further when reinforcing materials, such as glass fibers, are added. As a result, many possible applications for the high-temperature thermoplastics remain out of reach.

SUMMARY OF THE INVENTION

It is an object of the invention to provide glass/plastic compounds based on thermoplastics which have a high tracking resistance.

According to the invention, this is achieved by glass/plastic compounds which contain the following components:
a low-melting sulfophosphate glass of the following composition (in mol %): 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$,
a high-performance thermoplastic, and
an organic additive and/or a mineral filler, and if appropriate also
carbon black and/or a sterically hindered phosphite or phenol.

A "low-melting" sulfophosphate glass is understood as meaning a glass with a low glass transition temperature $T_g$, in particular a glass with $T_g$<approx. 500° C. A "high-performance thermoplastic" is a high-performance polymer, and specifically, in the present case, a heat-resistant polymer ("high-temperature resistant polymer"). This is important because both the temperature during production of the compounds and the working temperature (of the compounds) is >300° C.

The glass/plastic or glass/polymer compounds according to the invention have a high tracking resistance: the CTI value may be up to 250 V and above. This opens a wide range of applications for the novel high-performance compounds in electrical and electronic parts and components, i.e. a wider range of uses. It is also important that the high tracking resistance is achieved with even relatively small amounts of additives, which has a highly positive effect on the free-flowing properties and the mechanical properties.

The German Patent Application bearing the reference number 199 60 548.3 (application date: Dec. 15, 1999) describes glass/plastic compounds based on thermoplastic which contain the following components:
a low-melting sulfophosphate glass of the following composition (in mol %): 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and
a high-performance thermoplastic.

Compared to these compounds, the glass/plastic compounds according to the invention, which contain an organic additive and/or a mineral filler, have a CTI value which is increased by 50 to 100 V. If these compounds additionally contain carbon black and/or a sterically hindered phosphite or phenol, the tracking resistance is increased further, specifically to CTI values of ≧250 V.

In addition to the improved tracking resistance, the glass/plastic compounds according to the invention also have good mechanical and thermal properties and good processing properties, in particular a good ability to flow, even with a high filler content, i.e. a high glass content. Moreover, they are distinguished by an excellent chemicals resistance, in particular to water, acids and bases, and specifically, which is surprising, without the addition of stabilizers. Furthermore, these glass/plastic compounds have an excellent resistance to abrasion and the materials can be recycled without problems, since there is no shortening of the glass component as is the case in compounds reinforced with glass fibers.

The sulfophosphate glasses which are present in the glass/plastic compounds according to the invention have a glass transition temperature of 250° C.<$T_g$<280° C. It is preferable for a sulfophosphate glass of the following composition (in mol %) to be used in the compounds: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$. A glass of this type has a glass transition temperature of 268° C. By way of example, another glass has the following composition (in mol %): 9% of $Li_2O$, 5% of $Na_2O$, 7% of $K_2O$, 1.6% of CaO, 37% of ZnO, 20.4% of $P_2O_5$ and 20% of $SO_3$ ($T_g$=280° C.). By way of example, a further glass has the following composition (in mol %): 4.8% of $Li_2O$, 9.2% of $Na_2O$, 6.9% of $K_2O$, 1.6% of CaO, 35.9% of ZnO, 2.0% of $La_2O_3$, 19.6% of $P_2O_5$ and 20.0% of $SO_3$ ($T_g$=275° C.).

The high-performance thermoplastic used is advantageously a polyether ether ketone (PEEK), a polyetherimide (PEI), a polyphenylene sulfide (PPS), a partially aromatic polyamide, such as polyphthalamide (PPA), or a liquid-crystal polymer (LCP). In these polymers, the glass transition temperature of the glass component is matched to the working temperature of the thermoplastic material. Further high-performance thermoplastics which can be used are polyaryl ether ketones (PAEK) in general, for example polyether ketones (PEK), and polysulfones (PSU), in particular polyethersulfones (PES) and polyphenylene sulfones (PPSU).

The level of the glass component, i.e. of the sulfophosphate glass, in the glass/plastic compounds is preferably 15 to 60% by weight, based on the level of sulfophosphate glass and high-performance thermo-plastic. For certain applications, however, the glass contents may be up to 80% by weight. The compounds may also contain standard additives, such as coloring pigments and stabilizers. There are possible applications in, for example, sensors, actuators, plug connectors and relays.

The organic additive is preferably melamine cyanurate, a polysiloxane or a halogenated flame retardant, such as poly(haloaryl (meth)acrylate) and halogenated polystyrene. Further additives which can be used are elastomers, for example olefinic elastomers, rubbers, polyamides, fluoropolymers and organosilanes, such as 3-mercaptopropyl-trimethoxysilane.

The mineral filler is preferably mica, calcium sulfate ($CaSO_4$) or a zinc borate, such as $4ZnO.B_2O_3.H_2O$. However, other suitable fillers include magnesium hydroxide, aluminum hydroxide, aluminum borates, barium sulfate, antimony trioxide, titanium dioxide, calcium phosphate, pyrophosphates, in particular sodium and potassium pyrophosphate, ammonium polyphosphates and talc.

The level of organic additive and/or mineral filler in the glass/plastic compounds is advantageously 5 to 40% by weight, in particular 5 to 15% by weight, in each case based on the total weight. The level of carbon black is advantageously 0.1 to 1.0% by weight, in particular 0.2 to 0.5% by weight, and the level of sterically hindered phosphite or phenol is 0.5 to 1.5% by weight, in particular approx. 1% by weight, in each case based on the total weight.

Examples of suitable phosphites, i.e. esters of phosphoric acid, are compounds such as tris-(2,4-di-tert.-butylphenyl) phosphite. Examples of suitable phenols are (3,5-di-tert.-butyl-4-hydroxyphenyl)-propionate, such as the corresponding propionates of octadecanol and pentaerythritol.

The production of the glass/plastic compounds according to the invention takes place in such a manner that first of all—at elevated temperature—a masterbatch with a glass content of 60 to 90% by weight is produced from the two components sulfophosphate glass and high-performance thermoplastic. In the process, it was surprisingly discovered that using glass particles (glass grains) with a diameter of $\leq 1.5$ mm in the masterbatch resulted in glass structures in the $\mu$m and sub-$\mu$m range with a uniform distribution.

Then, in a second process step, the further processing takes place in such a manner that, by adding further high-performance thermoplastic to the masterbatch—at elevated temperature—the glass content is reduced to 15 to 60% by weight. The structure and homogenous distribution of the glass particles are not affected, i.e. are retained. Surprisingly, control experiments showed that the structure size and distribution of the type described are not obtained if the process proceeds directly from a batch with a glass content of, for example, 15%. Rather, uniformly distributed glass structures, even in the nm range, can only be achieved by starting from a masterbatch with a high proportion of the special sulfophosphate glass in a high-performance thermoplastic.

At the same time, in the second process step, an organic additive and/or a mineral filler is also added. If appropriate, carbon black and/or a sterically hindered phosphite or phenol may also be added.

The glass/plastic compounds according to the invention are produced at elevated temperature, preferably at approximately 320 to 420° C. During the production of the compounds, it is also possible to set the structure of the glass particles (isotropic/anisotropic) by means of the processing conditions.

Moreover, the compounds are distinguished by good bonding of the glass component to the thermoplastic material, as demonstrated in particular by the good chemicals resistance.

Since it is possible to start from relatively coarse particles of a sulfophosphate glass, the particle size being $\leq 4$ mm, preferably $\leq 1.5$ mm, the process according to the invention thus makes it possible to achieve inexpensive production even of glass/plastic compounds in which the glass particles are distributed uniformly and homogeneously in a high-performance thermoplastic and, moreover, can be set in a controlled manner even down to the nm range. This is achieved by using the viscosity of the individual components and the processing conditions, in particular the working temperature; the viscosity ratio of plastic to glass is generally approximately 1:1000. Compounds of this type are particularly suitable for the production of appliances and components for electrical engineering and electronics. This is because in these applications the important demands with regard to materials and processing properties are met and fault-free operation is ensured. In appliances and components used in electrical engineering and electronics, the compounds also allow the number of materials used to be reduced considerably, in particular with regard to the plastics, possibly even to the extent of using single grades. This allows inexpensive recycling of the materials while maintaining the filler properties.

DETAILED DESCRIPTION OF THE INVENTION

The invention is to be explained in more detail on the basis of exemplary embodiments. The sulfophosphate glass used in these embodiments has the following composition (in mol %): 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

EXAMPLE 1

(a) Production of a Masterbatch

The masterbatch is preferably produced on a co-rotating or counter-rotating twin-screw extruder with 11 separate cylinder heating zones (cylinder zone 1: charging funnel; cylinder zone 11: die). The worms are designed in such a manner that a plurality of kneading and shearing blocks and retarding disks are fitted in the cylinder heating zones 3 to 5. Zones 6 to 9 are fitted with dispersing elements and zones 10 to 11 include conveying elements.

The plastics used are either in powder form or in granule form (lentil granules or cylindrical granules with a length of 3 to 4 mm and a diameter of 2 to 5 mm); the glass has a grain size of $\leq 1.5$ mm. If plastic powder is used, first of all a dry mix (premix) with the appropriate ratio of glass (60 to 90%) to plastic (40 to 10%) is prepared and is then metered into the main metering part (charging funnel) of the extruder. If plastic granules are being used, both components are metered proportionately into the charging funnel via metering systems. This procedure can also be used when using plastic powder. Furthermore, it is possible for the plastic powder or granules to be metered into the charging funnel of the extruder and for the glass to be metered into the cylinder zones 3 to 5 via a side metering device. Both the glass and the plastic or the dry mix are thoroughly predried for at least 4 h at 100 to 150° C. before being processed. The compound is discharged through a slot die, cooled in a downstream water bath and then comminuted in a granulator. If the glass contents are very high, it is recommended to use a hot face-cutting means.

(b) Production of Glass/Plastic Compounds

The glass content in the masterbatch is reduced by means of the twin-screw extruder described. The final glass content of 15 to 60% by weight can be set in two ways:

(i) Masterbatch granules and base material are weighed in proportionately according to the final glass content which is to be established and prepared in a dry mix. This dry mix is metered into the charging funnel of the extruder. Therefore, the final compound is produced in a second extrusion step.

(ii) The production takes place in the same extrusion operation as the masterbatch production as a result of base material being metered—in accordance with the glass content which is to be established—into the cylinder zones 6 to 9 via a second side metering device. Therefore, only one extrusion operation is required to produce the final compound.

Variant (ii) is preferred, since the materials are exposed to the thermal load from the operation process only once, and therefore excessive molecular breakdown of the base material is avoided.

In variant (i), the cylinder temperature profile in zones 3 to 11 is in each case approximately 15 to 20° C. below the corresponding temperature profile described in (a).

At the same time as the base material (for reducing the glass content), all the additional substances, i.e. organic additive and/or mineral filler and if appropriate carbon black and/or sterically hindered phosphite or phenol, are also added to the masterbatch.

Glass/plastic compounds of the following composition are produced (parts by mass):

| Compound | PPS | Glass | Carbon black | CaSO$_4$ | Mica | Zinc borate |
| --- | --- | --- | --- | --- | --- | --- |
| 1 | 60 | 40 | 0.3 | 15 | — | — |
| 2 | 60 | 40 | 0.5 | — | 10 | — |
| 3 | 60 | 40 | 0.3 | — | — | 5 |

EXAMPLE 2

Tracking Resistance

Specimens in the form of flat plates with minimum dimensions of 15 mm×15 mm and a minimum thickness of 3 mm are produced from the compounds by injection molding. The tracking resistance is tested as described in DIN VDE 0303 Part 1 (id. IEC 112, Comparative tracking index CTI).

Test Arrangement:

Two platinum electrodes with a width of 5 mm and a thickness of 2 mm, which have been machined with a beveled edge at an angle of 30°, are arranged symmetrically with respect to a vertical plane, so that the angle between them is 60°; the surfaces which are positioned opposite one another are vertical, and the distance between them on a planar horizontal surface is 4 mm. A voltage source, a voltmeter and an overcurrent trip (0.5 A after 2 s) and droppers for two test solutions are present.

Test solution A: 0.1% by weight of NH$_4$Cl in distilled water;
Test solution B: 0.1% by weight of NH$_4$Cl and 0.5% by weight of sodium salt of diisobutyl-naphthalenesulfonic acid in distilled water.

Determination of the CTI Value:

The CTI value is the numerical value of the highest voltage at which there is no failure (overcurrent relay trips), i.e. no tracking distance, at five locations on the specimen after in each case 50 drops (at 30 s intervals) (e.g. CTI 425), specifically under the condition that when a further specimen is tested at five locations with a voltage which is 25 V lower, there is no failure after fewer than 100 drops. If this additional condition is not satisfied, the highest voltage at which five locations withstand 100 or more drops is determined, and this value is additionally specified, e.g. CTI 425 (375).

This test gave the following CTI values:

Compound 1: 225 V;
Compound 2: 250 V;
Compound 3: 250 V.

What is claimed is:

1. A glass/plastic compound based on thermoplastic and containing
    a low-melting sulfophosphate glass of the following composition in mol %: 4 to 10% of Li$_2$O, 4 to 10% of Na$_2$O, 4 to 8% of K$_2$O, 1 to 2% of CaO, 35 to 37% of ZnO, 0 to 3% of La$_2$O$_3$, 19 to 22% of P$_2$O$_5$ and 19 to 22% of SO$_3$,
    a high-performance thermoplastic, and
    an organic additive and/or a mineral filler, and optionally carbon black and/or a sterically hindered phosphite or phenol.

2. The glass/plastic compound as claimed in claim 1, wherein the sulfophosphate glass has the following composition: 4.9% of Li$_2$O, 9.4% of Na$_2$O, 7.1% of K$_2$O, 1.6% of CaO, 36.6% of ZnO, 20.0% of P$_2$O$_5$ and 20.4% of SO$_3$.

3. The glass/plastic compound as claimed in claim 1, wherein the high-performance thermoplastic is a polyether ether ketone, a polyetherimide, a polyphenylene sulfide, a partially aromatic polyamide or a liquid-crystal polymer.

4. The glass/plastic compound as claimed in 1, wherein the organic additive is melamine cyanurate, a polysiloxane or a halogenated flame retardant.

5. The glass/plastic compound as claimed in claim 1, wherein the mineral filler is mica, calcium sulfate or zinc borate.

6. The glass/plastic compound as claimed in claim 1, wherein the level of sulfophosphate glass is 15 to 60% by weight, based on the level of sulfophosphate glass and high-performance thermoplastic.

7. The glass/plastic compound as claimed in claim 1, wherein the level of organic additive and/or mineral filler is 5 to 40% by weight, based on the total weight.

8. The glass/plastic compound as claimed in claim 1, wherein the compound contains from 0.1 to 1.0% by weight of carbon black, based on the total weight.

9. The glass/plastic compound as claimed in claim 1, wherein the compound contains from 0.5 to 1.5% by weight of phosphite or phenol, based on the total weight.

10. The glass/plastic compound as claimed in claim 2, wherein the high-performance thermoplastic is a polyether ether ketone, a polyetherimide, a polyphenylene sulfide, a partially aromatic polyamide or a liquid-crystal polymer.

11. The glass/plastic compound as claimed in claim 2, wherein the organic additive is melamine cyanurate, a polysiloxane or a halogenated flame retardant.

12. The glass/plastic compound as claimed in claim 2, wherein the mineral filler is mica, calcium sulfate or zinc borate.

13. The glass/plastic compound as claimed in claim 2, wherein the level of sulfophosphate glass is 15 to 60% by weight, based on the level of sulfophosphate glass and high-performance thermoplastic.

14. The glass/plastic compound as claimed in claim 2, wherein the level of organic additive and/or mineral filler is 5 to 40% by weight, based on the total weight.

15. The glass/plastic compound as claimed in claim 2, wherein the compound contains from 0.1 to 1.0% by weight of carbon black, based on the total weight.

16. The glass/plastic compound as claimed in claim 2, wherein the compound contains from 0.5 to 1.5% by weigh of phosphite or phenol, based on the total weight.

17. A process for producing a glass/plastic compound based on thermoplastic, which comprises:

producing in a first step, at elevated temperature, a masterbatch with a glass content of 60 to 90% by weight from a sulfophosphate glass and a high-performance thermoplastic; and reducing in a second step, the glass content to 15 to 60% by weight by adding further high-performance thermoplastic at elevated temperature, with an organic additive and/or a mineral filler and, optionally carbon black and/or a sterically hindered phosphite or phenol at the same time.

* * * * *